United States Patent
Namerow (10) Patent No.: US 11,730,138 B2
(45) Date of Patent: Aug. 22, 2023

(54) PORTABLE MOTION STABLE WATER DELIVERY SYSTEM FOR PETS

(71) Applicant: RocKur Designs, LLC, Odessa, FL (US)

(72) Inventor: Lynne Ellen Namerow, Odessa, FL (US)

(73) Assignee: RocKur Designs, LLC, Odessa, FL (US)

( * ) Notice: Subject to any disclaimer, the term of this patent is extended or adjusted under 35 U.S.C. 154(b) by 0 days.

(21) Appl. No.: 17/233,123

(22) Filed: Apr. 16, 2021

(65) Prior Publication Data

US 2022/0330520 A1  Oct. 20, 2022

(51) Int. Cl.
*A01K 5/01* (2006.01)
*A01K 7/00* (2006.01)
*A01K 27/00* (2006.01)

(52) U.S. Cl.
CPC ............ *A01K 5/0107* (2013.01); *A01K 7/005* (2013.01); *A01K 27/003* (2013.01)

(58) Field of Classification Search
CPC ..... A01K 5/0107; A01K 7/005; A01K 27/003
USPC .................. 224/578; 119/61.5, 61.54, 61.56
See application file for complete search history.

(56) References Cited

U.S. PATENT DOCUMENTS

| | | | | |
|---|---|---|---|---|
| 251,048 A | * | 12/1881 | Heiser et al. .......... | A01K 5/008 119/65 |
| 354,050 A | * | 12/1886 | Dyer et al. ............. | A01K 5/008 119/65 |
| 457,032 A | * | 8/1891 | Salter ..................... | A01K 5/008 248/150 |
| 482,730 A | * | 9/1892 | Ehrhardt ................ | A01K 5/008 119/65 |
| RE11,302 E | * | 1/1893 | Demming et al. ....... | A45C 3/00 401/121 |
| 612,637 A | * | 10/1898 | Aull ................... | B65D 5/46048 229/911 |
| 628,451 A | * | 7/1899 | Dawson ................ | A01K 5/008 119/53 |
| 655,085 A | * | 7/1900 | Howard ................ | A01K 5/008 119/65 |
| 734,103 A | * | 7/1903 | Still ...................... | A01K 5/008 119/65 |
| 783,849 A | * | 2/1905 | Winslow ............... | A01K 5/008 119/65 |

(Continued)

OTHER PUBLICATIONS

"Outward Hound Port-A-Bowl Dog Dish by Outward Hound," <https://www.amazon.com/Kyjen-Outward-Hound-Port-Mledium/dp/B0081XICJO/>, retrieved Apr. 7, 2021.

(Continued)

*Primary Examiner* — Joshua J Michener
*Assistant Examiner* — Nicole Paige Maccrate
(74) *Attorney, Agent, or Firm* — Panovia Group LLP (57) ABSTRACT

A food or water container for use by animals. The container may be formed from a flexible and thus collapsible material for safety and portability. The container may be further provided with a strap for hanging the container during use and may be especially adapted for use in a moving vehicle, with the strap enabling pendular movement of the container to lessen the effect of movement of the vehicle and reduce spillage. Additional features such as a spill guard, and a removable, multi-purpose strap are also contemplated.

19 Claims, 8 Drawing Sheets

(56) References Cited

U.S. PATENT DOCUMENTS

| | | | | |
|---|---|---|---|---|
| 831,000 A * | 9/1906 | Howard | | A01K 5/008 119/65 |
| 880,651 A * | 3/1908 | Gaul, Jr. | | A01K 5/008 119/65 |
| 896,619 A * | 8/1908 | Burke | | A01K 5/008 119/65 |
| 993,286 A * | 5/1911 | Avey | | A01K 5/008 119/65 |
| 1,011,674 A * | 12/1911 | Toth | | A01K 5/008 119/65 |
| 1,016,075 A * | 1/1912 | Kowalsky | | A01K 5/008 119/65 |
| 1,023,643 A * | 4/1912 | Gruener | | A01K 5/008 119/65 |
| 1,033,046 A * | 7/1912 | Benton | | A01K 5/008 119/65 |
| 1,033,463 A * | 7/1912 | Piotrowski | | A01K 5/008 119/65 |
| 1,033,705 A * | 7/1912 | Kadanecz | | A01K 5/008 119/65 |
| 1,051,682 A * | 1/1913 | Ceglowski | | A01K 5/008 119/53 |
| 1,095,631 A * | 5/1914 | Heilborn | | B65D 33/065 220/904 |
| 1,145,953 A * | 7/1915 | Wheaton | | B65D 88/1618 220/904 |
| 1,152,846 A * | 9/1915 | Ross | | B65D 33/10 383/29 |
| 1,183,563 A * | 5/1916 | Heiaffel | | A01K 5/008 119/65 |
| 1,202,085 A * | 10/1916 | Mitchell | | B65D 33/007 220/904 |
| 1,246,720 A * | 11/1917 | Cox | | A01K 5/008 119/65 |
| 1,277,486 A * | 9/1918 | Rosenthal | | A01K 5/008 119/65 |
| 1,289,410 A * | 12/1918 | Day | | A45F 3/20 383/7 |
| 1,421,142 A * | 6/1922 | Asaturian | | A01K 5/008 119/68 |
| 1,681,922 A * | 8/1928 | Boch | | A45C 3/00 5/490 |
| D195,166 S * | 5/1963 | Mason et al. | | A01K 5/008 D30/132 |
| 3,118,560 A * | 1/1964 | Cornelius | | A47J 41/0077 220/759 |
| 3,611,998 A * | 10/1971 | Loscalzo | | A01K 5/0114 D30/129 |
| 3,679,126 A * | 7/1972 | Lake | | B65D 33/24 428/101 |
| 4,436,056 A * | 3/1984 | MacLeod | | A01K 5/0135 119/61.54 |
| 4,762,087 A * | 8/1988 | Henecke | | A01K 5/0114 119/61.56 |
| 5,105,768 A * | 4/1992 | Johnson | | A01K 7/005 119/72 |
| D339,679 S * | 9/1993 | Poulin | | A01K 5/008 D3/258 |
| 5,669,525 A * | 9/1997 | Sapyta | | A01K 5/008 220/904 |
| 6,019,244 A * | 2/2000 | Jones | | A01K 7/00 220/666 |
| 6,148,767 A * | 11/2000 | Manchess | | A01K 7/00 119/74 |
| D438,348 S * | 2/2001 | Grady | | A01K 5/008 D30/129 |
| 6,287,002 B1 * | 9/2001 | Sherman | | A45C 13/1046 383/73 |
| 6,401,954 B1 * | 6/2002 | Gamble | | A01K 7/00 206/547 |
| 6,783,016 B2 * | 8/2004 | Wang | | A42B 1/006 383/4 |
| D502,294 S * | 2/2005 | Hung | | A01K 5/008 D30/129 |
| D605,817 S * | 12/2009 | LeCoq | | A01K 5/008 D30/129 |
| D606,710 S * | 12/2009 | Spater | | A01K 5/008 D30/129 |
| 7,631,779 B1 * | 12/2009 | Dean | | B65D 25/32 220/555 |
| 8,109,234 B1 * | 2/2012 | LeCoq | | A01K 5/0128 119/61.5 |
| 8,807,083 B1 * | 8/2014 | Ross | | A01K 7/00 222/207 |
| D777,992 S * | 1/2017 | Tsengas | | A01K 5/008 D30/129 |
| 9,615,540 B1 * | 4/2017 | Mansour | | A01K 7/00 |
| 9,770,009 B1 * | 9/2017 | Hagerman | | B29C 39/00 |
| 2005/0127073 A1 | 6/2005 | Kusuma | | B65D 21/086 220/6 |
| 2009/0283047 A1 * | 11/2009 | Swenson | | A01K 5/0114 119/61.5 |
| 2016/0183666 A1 * | 6/2016 | Whitehill | | A45C 13/30 224/578 |
| 2017/0081071 A1 * | 3/2017 | Piechocinski | | B65D 5/563 |
| 2018/0177154 A1 * | 6/2018 | Etherton | | A01K 7/005 |

OTHER PUBLICATIONS

"Collapsible Dog Bowl, Portable Foldable Travel Water Food Bowls with Carabiner Clip for Walking, Traveling, Hiking by Guardians," <https://www.amazon.com/Collapsible-Silicone-Portable-Foldable-Carabiner/dp/B07568NGHM/>, retrieved Apr. 7, 2021.

"Fly Dog Pets 10001 Flydog Spill-Proof Water Bowl by Fly Dog Pets," <https://www.amazon.com/Flydog-Spill-Proof-Travel-Bowl-Pet/dp/B0087PAUKU/>, retrieved Apr. 7, 2021.

"Bessie Sparks 1XCar Cartoon Dog Trash Can Portable Garbage Bin Collasible Pop-Up Water Proof Bag Rubbish Bin Hanging Wastebasket by Bessie Sparks," <https://www.amazon.ca/Bessie-Sparks-Portable-Collapsible-Wastebasket/dp/B07XD9GB7B>, retrieved Apr. 7, 2021.

"Quencher Packable Dog Bowl by Ruffwear," <https://ruffwear.com/collections/dog-bowls/products/quencher-packable-dog-bowl>, retrieved Apr. 7, 2021.

"Kurgo Splash Free Wander Water Bowl, No Spill Dog Travel Bowl, Portable No Mess Bowl for Dogs, Splash Less Car Bowl for Pets, Car Accessories, by Kurgo," <https://www.amazon.com/Kurgo-Portable-NoSpill-Accessories-Coastal/dp/B06XWJGT88>, retrieved Apr. 7, 2021.

"Kibble Carrier by Kurgo," <https://www.kurgo.com/dog-travel/travel-essentials/kibble-carrier/>, retrieved Apr. 7, 2021.

"High Road Wag'nRide Doggie Seatback Organizer by High Road," <https://www.highroadorganizers.com/Wag-nRide-Dog-Car-Back-Seat-Organizer-p/hr-dg-101blk.htm>, retrieved Apr. 7, 2021.

"Frisco Stainless Steel Kennel Bowl by Frisco," <https://www.chewy.com/frisco-stainless-steel-kennel-bowl/dp/186600>, retrieved Apr. 7, 2021.

* cited by examiner

PORTABLE MOTION STABLE WATER DELIVERY SYSTEM FOR PETS

BACKGROUND

Field of the Invention

Aspects of the present invention relate to effective provision of sustenance, e.g., water and/or food. In a more specific aspect, the invention relates to transporting water and/or food for an animal. In a still more specific aspect, the invention relates to a container for supporting a liquid in a manner accessible to an animal while the container is in motion. In a still more specific aspect, the invention relates to a hanging pouch for supporting a liquid in or on a moving object, the container being open-ended for use by an animal yet resistant to spillage due to motion.

Background of the Technology

Many pet owners recognize the need to have sustenance including food and water readily available for provision to their animals. Known in the art are a variety of animal/pet-related food and water supply devices. Among them are various portable water containers. Outward Hound Dog Travel Accessories and Gear is an example of a collapsible, fabric water bowl. Plastic and silicone collapsible water bowls have also been seen. Such bowls are not for use in motion, but rather need to be removed, filled, used, emptied, and returned to storage, as during travel.

Other products are designed for use in a vehicle. The Flydog Spill Proof Pet Travel Bowl is an example of a hanging water bowl. This design, however, suffers from a number of potential drawbacks, depending upon usage. It is disclosed as requiring assembly with a screwdriver, and thus cannot be easily disassembled for cleaning and transport (e.g., cannot be readily folded and carried in backpack), is bulky and takes up considerable space, is not fully securable to seat headrest posts, and being made of hard plastic may be subject to breakage. The material may cause injury if an animal bumps or falls into it, and more so due to jagged edges upon breakage. Height adjustment also appears to be limited.

Other types of storage bags attach to a vehicle headrest but do not support feeding for direct use by animals. Still others, as noted herein, are made from hard plastic which can crack and hurt animals should they inadvertently come into forceful contact therewith, and these are not easy to transport for "on the go" activities. The pet care category includes other collapsible travel bowls but none that offers the product benefits and features outlined herein.

Some pet owners still struggle to provide to their animals sustenance, especially water, on-demand in a safe, convenient manner at any time, including while traveling. Thus, for these and other reasons, an improved container that reduces or eliminates spillage when used in moving objects is desired.

SUMMARY OF THE INVENTION

Aspects of the present invention seek to overcome the above-identified drawbacks and/or others, by providing a stable food and water delivery system, as for pets or other animals.

In one aspect, the invention has as an objective to keep a travel bowl off the seat and floor of a vehicle, seeking to avoid it being stepped upon and avoiding occupying precious space during a trip, while also being easily accessible for the animal at the appropriate height. The soft material, form-keeping bowl shape and removable adjustable strap, among other features, lend themselves to a "Go Anywhere" design to enable taking the bowl along to any desired location, while a shape of the bowl, a placement of d-rings and the swinging action of the strap keeps the bowl from tipping over and spilling the contents in the vehicle during motion. It also prevents spillage when the animal moves around the back seat, and avoids animals having to move to the footwell of a vehicle, which may be more or less accessible depending upon a particular vehicle, a wide range of sizes of animal, etc. Additionally, during long periods in a vehicle, this travel bowl may save time by reducing or eliminating the need for a water break while on the road, while still keeping the animal hydrated.

In one embodiment, a container in accordance with the invention includes a body having an approximately cylindrical shape; a base at a first end of the body; an opening at a second end of the body opposite the first end; a spill guard, adjacent the opening, formed in a first portion of a circumference of the approximately cylindrical shape of the body; and a strap coupled to the body for supporting the container during use. In one aspect, the spill guard may comprise an extension of the first portion of the circumference of the cylindrical shape, such that a first length of the cylindrical shape that includes the first portion of the circumference is greater than a second length of the cylindrical shape that includes a second portion of the circumference, the second portion being opposite the first portion. In another aspect, the body may comprise a flexible material. In another aspect, the body may comprise an inner lining; and an outer shell. In another aspect, the inner lining may comprise a food-safe, waterproof material. In another aspect, a first hook may be connected to a first end of the strap, the strap being detachable from the body and length-adjustable for use as a pet leash. In another aspect, the strap may comprise an overlapping material being adjustable in length and adjustable to form a hand-hold. In another aspect, a second hook may be connected to a second end of the strap. In another aspect, the body may comprise an outer shell; and an inner liner disposed within the outer shell and formed from a food-safe, waterproof material. In another aspect, the container may comprise a trim portion about the outer circumference of the approximately cylindrical shape of the body adjacent the opening and overlapping a junction formed between the inner lining and the outer shell. In another aspect, the base may have formed therein at least one weep hole to increase air flow between the inner lining and the outer shell. In another aspect, the container may comprise a support connected to the body of the container as a connection point for releasably coupling the strap to the body of the container.

In one embodiment, a container for supporting a quantity of a liquid in accordance with the invention may comprise a body made primarily from a flexible, waterproof liner formed into a side, an open end, and a closed base opposite the open end; and a strap releasably connected to the body for coupling the container to an object during use; the body being constructed to at least temporarily maintain a liquid without leakage through the body; and the body being supported by the strap such that upon movement of the object, resulting pendular motion of the body acts to lessen movement of the body with respect to the object. In one aspect, the container may comprise an outer shell disposed about the body and covering at least a portion of the liner.

Additional advantages and novel features in accordance with aspects of the present invention will be set forth in part in the description that follows, and in part will become more apparent to those skilled in the art upon examination of the following or upon learning by practice thereof.

DETAILED DESCRIPTION

The detailed description set forth below in connection with the appended drawings is intended as a description of various potential configurations and embodiments, and is not intended to represent the only configurations in which the concepts described herein may be practiced. The detailed description includes specific details for the purpose of providing a thorough understanding of various concepts. It will be apparent to those skilled in the art, however, that these concepts may be practiced without these specific details.

Figure 1A:
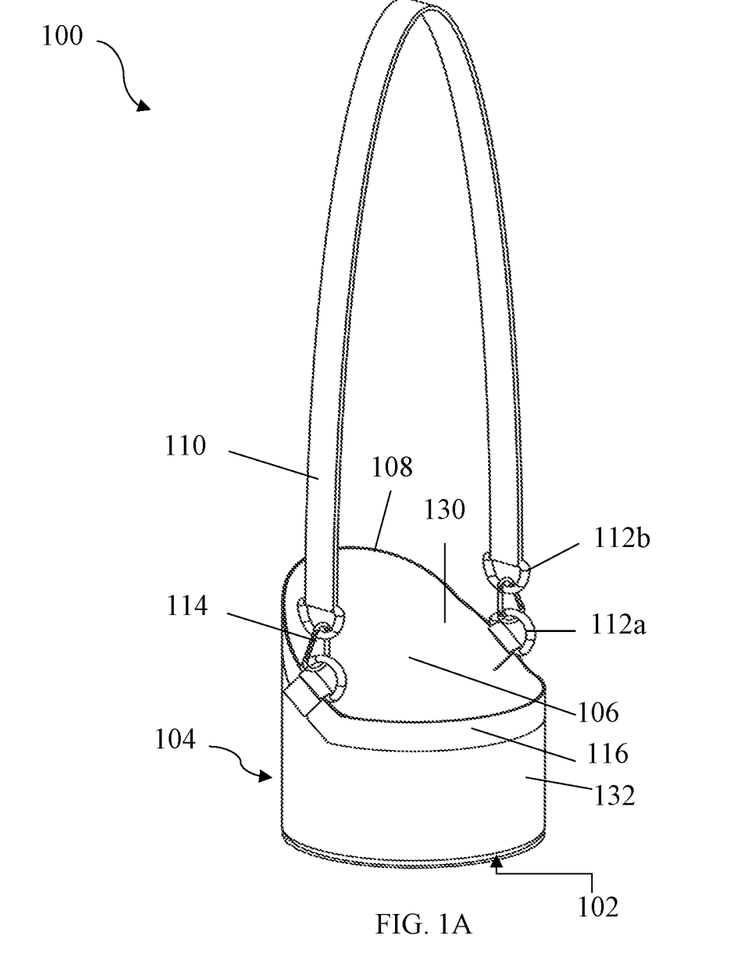
FIG. 1A shows a perspective view of an embodiment of a water/food container in accordance with the present invention.

In one embodiment, illustrated by FIG. 1A, the invention is an animal travel container or bowl 100, especially for use in a vehicle. The bowl 100 in this embodiment has a bottom 102 and at least one side to form an overall container body 104. The bowl 100 has an opening 106 for filling by a user and for ready access by the animal. In one embodiment, the body 104 may take on a generally cylindrical shape as illustrated, although variations in this shape are contemplated, including square/rectangular, elliptical in cross-section, etc., among many others.

It is generally contemplated that a container in accordance with the invention be hung for usage, though usage supported on a surface is also possible. In one embodiment, the bowl 100 is adapted to be hung by a strap 110 from a relative fixed point of a vehicle in a manner that permits movement of the bowl 100. That is, while the bowl 100 is subject to movement in an earth frame, it is nonetheless supported by a relatively fixed point with respect to an interior of a vehicle.

For example, the bowl 100 may be hung from a head rest of a seat of a vehicle; such seats generally being disposed at an angle somewhat removed from vertical, the bowl 100 is thus free to move in all directions. As will be appreciated by one skilled in the art, as a body is subject to acceleration (whether linear and/or angular, or deceleration), i.e., a change in speed and/or direction, the body, and any objects therein, will experience inertial forces. Likewise, upon acceleration of a vehicle containing the bowl 100, the bowl 100, and particularly liquid therein, will experience such forces. These forces will translate only minimally via the strap 110 to the bowl 100, however, resulting in a corresponding pendular movement of the bowl 100, as the forces are reduced or dampened through a length of the strap. The bowl thus experiences significantly less force than, for example, a container resting on a floor of the same vehicle in motion. Likewise, anything contained within the bowl 100 will also experience less force and, especially in the case of a liquid, be much less susceptible to movement with respect to the bowl and therefore spillage. Moreover, to the extent the bowl 100 does experience forces, it is able to move in a manner similar to any liquid contained therein. The reduced relative movement of the bowl 100 and liquid contained therein thus avoids or greatly reduces spillage due to movement of the vehicle. As noted herein, hanging a container 100 from the back of a car seat may carry additional advantages as well, such as keeping floor space clear.

The pendulum effect of the container 100 may be accomplished using various hanging means, including the illustrated strap 110, which may likewise be connected to the container 100 in a variety of ways. In one embodiment, straps 110 are connected to the container 100 via connectors 112a and 112b, illustrated by FIG. 1A as d-rings, respectively connected to the container 100 and strap 110. This allows the connection point to flex with movement, allowing easier access by an animal and preventing the container 100 from tipping over. The d-rings 112a may be sewn into a trim portion of the container 100, if provided, into a body of the container 100, or otherwise appropriately connected, for example an optional webbing 116 or other trim material, which may be provided to cover the sewn edges of the liner and shell and may help to create and maintain a shape of the bowl 100. For connectors 112a and 112b, either one or both individually or as sets, releasable connectors may also be used as desired, as for selecting from a variety of available strap lengths, widths, materials, etc., as applicable to a particular environment. In one embodiment, connector 112a comprises a fixed ring attached at any of a variety of points (see also FIG. 1B, 117), while connector 112b comprises a releasable hook. In one embodiment, carabiners 114 are utilized. Other options include a variety of open-ended, closed, releasable, etc., attachment means, such as a snap hook, s-hook, Velcro® and others.

Figure 1B:
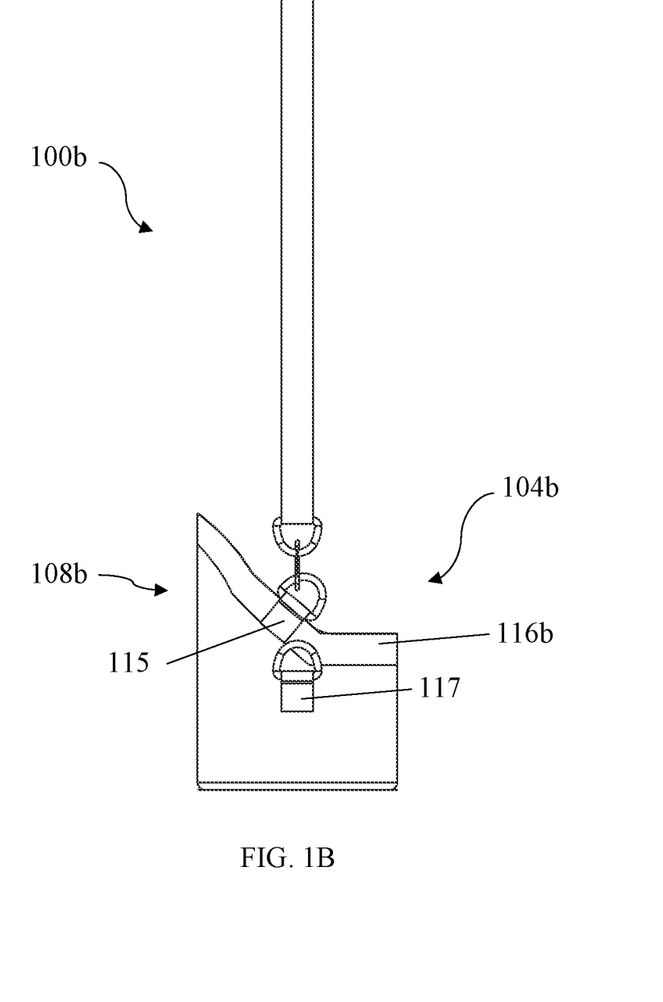
FIG. 1B shows a side view of an embodiment of a water/food container in accordance with the present invention.

FIG. 1B shows an embodiment of the bowl 100b from a different perspective. Also illustrated are various embodiments of strap 110 connection points as d-rings 115 and 117, d-ring 115 being shown connected to trim or webbing 116b, and d-ring 117 being connected to a body 104b of the container 100b. Either configuration, or both simultaneously, among a variety of other designs, may be used, depending on a particular implementation. FIG. 1B also illustrates an alternate view of a spill protector as a backsplash 108b. A height difference between a portion of the body 104b including the backsplash 108b, versus an opposite portion of the body 104b that does not include the backsplash 108b, may vary widely. In one embodiment, the backsplash 108b effectively extends the length (height in an anticipated orientation during use) of the body 104b at its shortest point by approximately 80 percent. A higher or lower backsplash 108b my likewise be utilized, depending upon a particular implementation. Moreover, a backsplash 108*b* may be of similar or varying shape, for example curved, square/rectangular, etc., and may extend parallel to a body 104*b*, or be angled toward or away from the opening 106 (FIG. 1A).

Figure 1C:
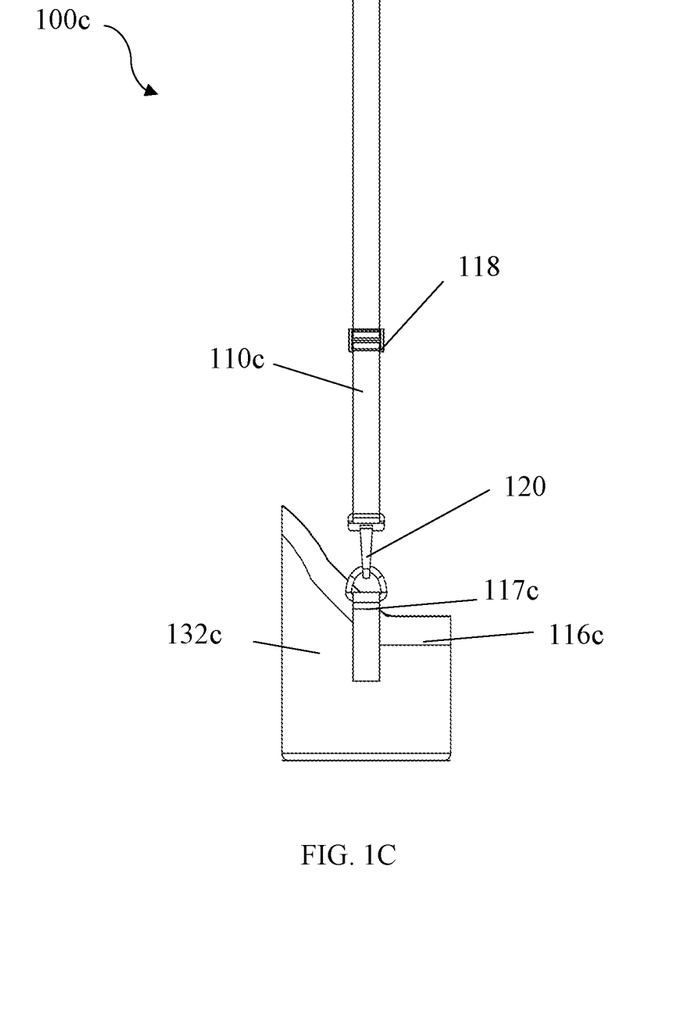
FIG. 1C shows a side view of an embodiment of a water/food container in accordance with the present invention.

FIG. 1C illustrates yet another attachment mechanism of a bowl or container 100*c* in accordance with an embodiment of the invention. As shown, a d-ring 117*c* might alternatively be attached to both a trim portion 116*c* and a shell portion 132*c*. FIG. 1C further illustrates an alternative mechanism in the form of a clip 120 for connecting to the d-ring 117*c* a strap 110*c*, and a tri-glide slide mechanism 118 for adjusting a length of the same.

Figure 1D:
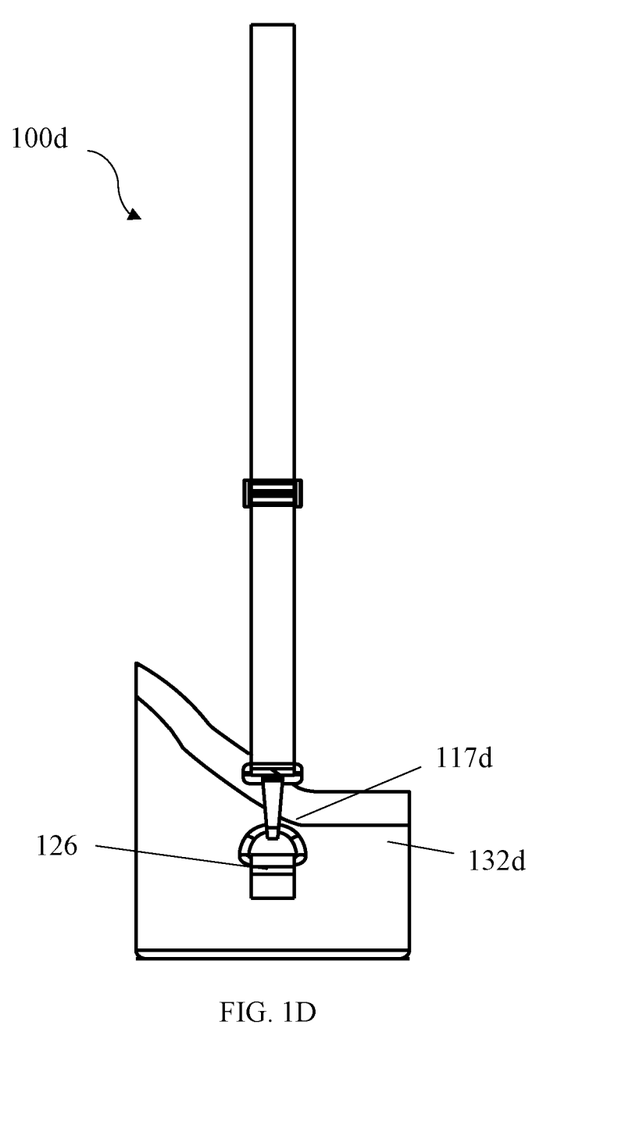
FIG. 1D shows a side view of an embodiment of a water/food container in accordance with the present invention.

FIG. 1D illustrates yet another embodiment of a container 100*d* in accordance with the invention. As detailed herein, features of the invention may be added, removed and/or modified depending upon a particular implementation. The container 100*d* is illustrated having a d-ring 117*d* connected by an anchor 126 to a shell 132*d*. As in other embodiments, the d-ring 117*d* might be connected directly to the shell 132*d*, or via the anchor 126, which may be fabric connected by stitching or other means, metal connected by rivets, etc. Countless variations are contemplated.

Figure 1E:
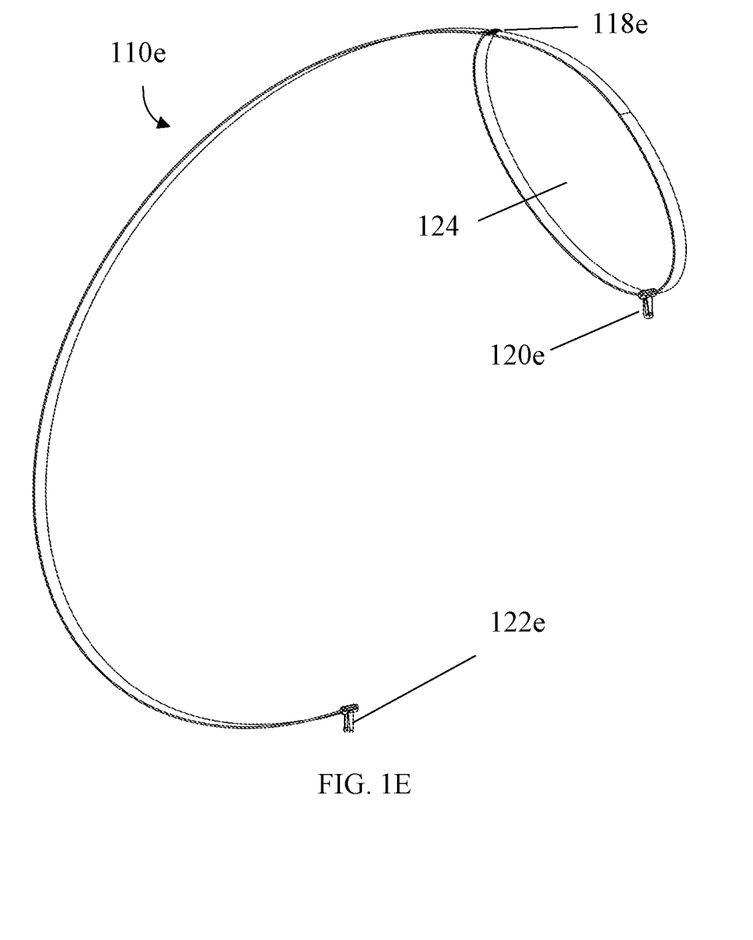
FIG. 1E shows a perspective view of an embodiment of a multi-use strap in accordance with the present invention.

FIG. 1E illustrates embodiments of a strap 110*e* in accordance with the invention. Like the strap 110 described with reference to FIG. 1A, the strap 110*e* may be adjustable in conventional ways, as by altering a length of the strap 110*e* to compensate for differences in vehicles and animals, to provide easy access for the animal at appropriate height, and to provide enough space with respect to a rear seat and/or other elements in a vehicle. In one embodiment, a tri-glide slide 118*e* is used, with the strap overlapping itself through a portion of its length to form a double-length of material, thereby acting to shorten or extend the operative length of the strap 110*e*. In addition to height adjustment, an adjustable strap might also be adapted for multi-purpose use. For example, in one embodiment, the strap 110*e* also serves as a pet leash, with a releasable clip or hook 122*e* for easy connection and release from the collar ring of a pet, such as a dog. By adjusting the strap toward its full length by moving the tri-glide slide 118*e*, a natural hand hole or grip 124 is created opposite a length of the strap/leash from the hook. That is, the strap 110*e* may be adapted such that, when it is extended to full length, it has a hook on one end that is secured to the straight length of webbing while the opposite end creates a natural hand hold 124, with a second hook 120*e* on the hand hold 124. The hook 120*e* at the handhold 124 end of the extended strap might also be used to support other items, such as keys, which could be of convenience for daily use, or, as another example when, during highway travel or other such occasion, a leash has been forgotten. Or during a hike when a leash or other means for restraining, hanging, etc., is required unexpectedly, among countless other examples.

Moreover, the container or bowl 100 may further be provided with one or more additional protections against spillage. In one embodiment, the bowl 100 includes, as illustrated by FIG. 1A, a raised back, or backsplash 108, alternately termed splash-guard, spill-guard, etc., for still further spill protection. For example, many car seat backs are finished with cloth or leather and owners may want to protect that material. The raised backsplash 108 of the bowl 100 protects the back of the seat on which the bowl is hanging. When a vehicle makes a hard stop, the natural in-motion reaction is for the water to move towards the front of the vehicle. Therefore, the raised backsplash allows the water to roll up the backsplash and back into the bowl without spilling over the back of the bowl and onto the back of the front seat. The second purpose is to help protect the back of the front seat from animals who are messy drinkers and splash or dribble when they drink. Additional implementations are further contemplated, such as a built-in or add-on lip or flange on an interior or exterior of an upper edge of the container 100, to reduce splashing about its full circumference. In another embodiment, a spill-catching base mat is provided that may have a larger diameter than a base of the container 100 to retain any overflow. Such a base mat again might be built-in, or might be an add-on accessory attachable to and removable from the base of the container 100, as by magnets, snaps, Velcro®, etc.

Of course, usage of a product in accordance with the invention is not limited to any particular location in a car or any other vehicle, or to within a vehicle at all. Many other environments and attachment points are contemplated, including a support handle, car seat, cabinet handle, picnic table, tree branch, a person's shoulder, etc.

Construction

Depending upon a desired usage, a liquid container in accordance with the invention may be constructed in a variety of ways from a variety of materials. In one embodiment, primarily soft materials are used for animal safety, limiting hard materials to d-rings or other connectors when additional strength is required. Nonetheless, hard plastic may be used in addition to metal, and any such materials might be covered by fabric and/or coated as by rubber, silicone, etc., so as to not fully sacrifice durability.

Waterproof materials are preferably used, at least for an inner liner 130 (see FIG. 1A) in embodiments in which use for water or other liquid is anticipated. For use with a consumable liquid, an inner lining may utilize a food-grade, waterproof fabric. If desired, a distinct outer lining or shell 132 may be provided, for example an outdoor utility fabric, although many variations are contemplated. A trim 116 as well may be optionally provided. In one embodiment, a webbing type material is utilized.

In various environments, a soft, collapsible design may be desired, such that the container may be easily emptied and folded or rolled up for storage or transport, as by clipping to a backpack, belt loop, purse, etc. In some cases, washability of the overall product may be desired as well The strap 110 (FIG. 1A) may likewise be made from a variety of materials. In one embodiment, a flexible material is desired, such as a webbing or bungee-type material. In one specific embodiment, a cord is used having plastic, tri-glide slides and plastic swivel snap hooks. Straps may also be custom made to specific desired fixed or adjustable lengths. An owner of a large truck or van may need a strap that adjusts to, for example, 72 inches, among countless other possibilities.

Figure 2:
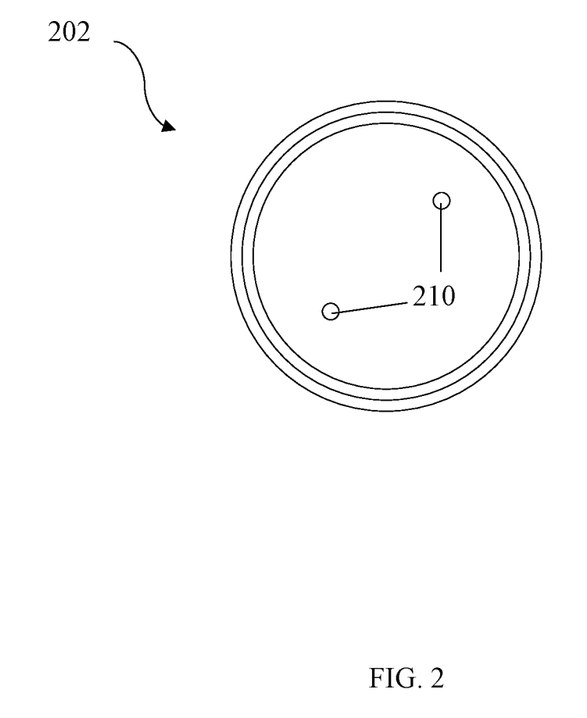
FIG. 2 shows a materials view of an embodiment of a shell bottom of a water/food container in accordance with the present invention.

Yet another additional feature of the container 100 that may optionally be provided is/are one or more weep holes 210 in the base 202, as illustrated by FIG. 2. The base 202 may be a unitary part of the outer shell 132 (FIG. 1A) or may be discretely formed, as by being sewn in/on, as disclosed herein. Regardless, holes 210 seek to allow air flow between the shell 132 and the liner 130 (FIG. 1A) to assist in drying any moisture between layers after usage, cleaning, etc., of the bowl. During cleaning, for example, water may seep through stitching of the container 100, in an embodiment in which a shell 132 is separate from the liner 130 and includes sewn seams, for example. While such seams might to some extent allow air to enter and/or water to drain, weep hole(s)

210 might be provided to more readily allow water to drain and air to enter in order to accelerate the drying process.

Specifications

Figure 3:
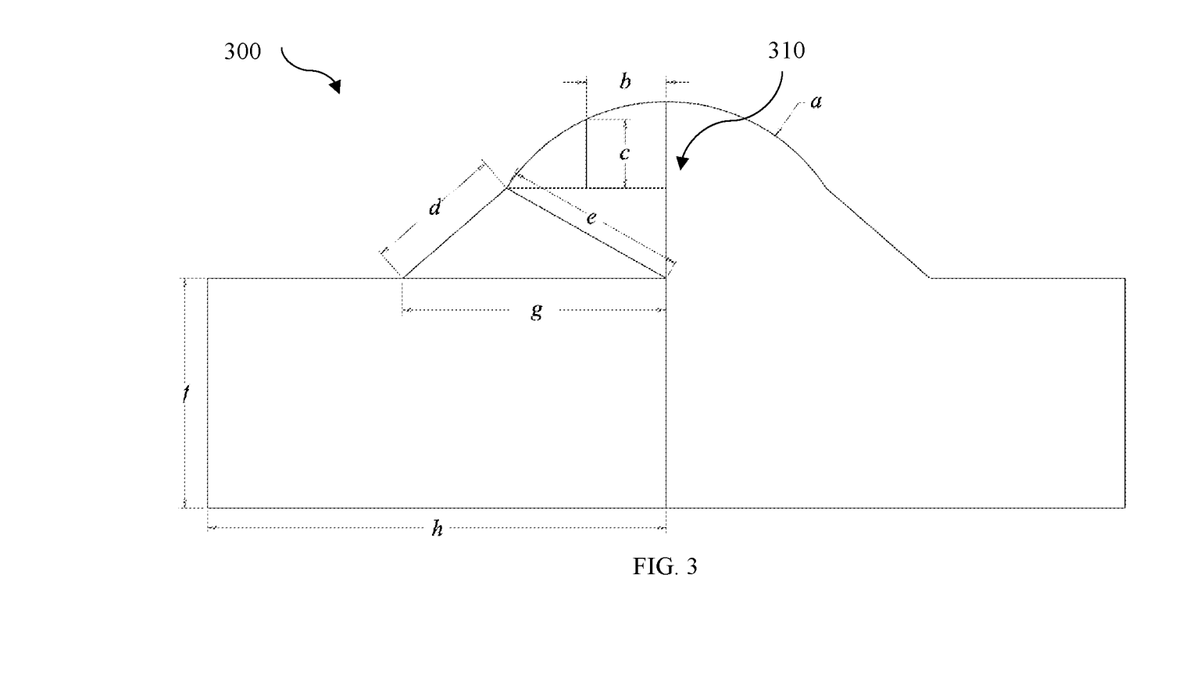
FIG. 3 shows a materials view of an embodiment of a shell of a water/food container in accordance with the present invention.

Various dimensions are contemplated in accordance with the present invention, and may be affected by such factors as a manufacturing process used, a size desired, and other features of an intended end use. In one embodiment, a bowl in accordance with the invention holds approximately 32 ounces (approx. 1 liter (L)) of water when used in a moving vehicle and up to approximately 40 ounces (1.2 L) of water if placed on hard non-moving surface, for example a floor or the ground. One or more recommended fill-lines may be provided, as on an interior, e.g., on the inner liner 130. In one embodiment, the backsplash 108 is 8½ to 9 inches (approx. 22 centimeters (cm)) high and gradually slopes to the sides to a height of about 5 inches (12.7 cm). In one embodiment, the base or bottom 202 materials size is approximately 7 inches in diameter. Upon assembly, the materials of FIGS. 2 and 3 are joined together, for example by sewing, to create the final shape of the outer shell 104 (see FIG. 1A). During the joining process of the two component parts, an overlap of the bottom 202 with the associated side piece 300 may result in a smaller overall diameter, for example of approximately 6 inches. Again, all of these measurements, like others herein, are approximate and purely exemplary.

Figure 4:
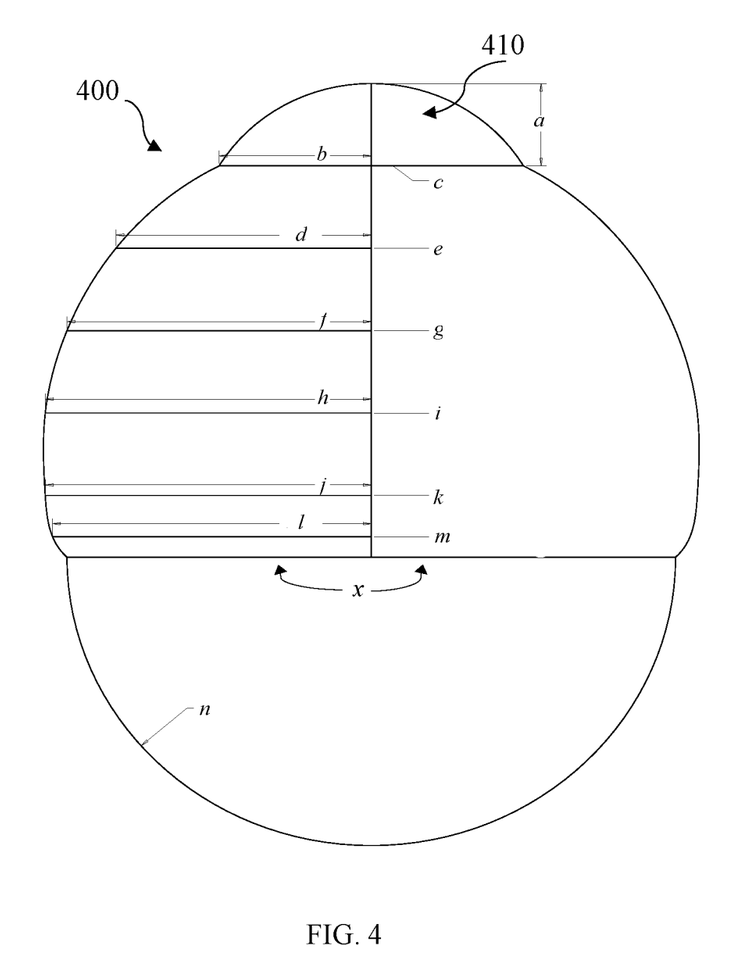
FIG. 4 shows a materials view of an embodiment of a liner of a water/food container in accordance with the present invention.

For a fuller appreciation of the invention, FIGS. 3 and 4 are provided to illustrate, in cooperation with that of FIG. 2, exemplary components of embodiments of the invention. FIG. 3 illustrates an exemplary outer shell 300. In one embodiment, the dimensions labeled in FIG. 3 and corresponding measurements indicated in Table 1 are as follows:

TABLE 1

| Reference Character | Length (in.) |
| --- | --- |
| a | 4.17 (radius) |
| b | 1¾ |
| c | 1½ |
| d | 3 |
| e | 4 |
| f | 5 |
| g | 5¾ |
| h | 10 |

FIG. 4 illustrates an exemplary inner liner 400. Upon assembly, the liner 400 is placed inside of the shell 300 as the shell 300 is fixed into the form of the bowl 100, as by sewing, heat sealing or other form of adhesion, stapling, etc., or other appropriate method of assembly. The backsplash portion 410 of the liner 400 cooperates with the sloped backsplash 310 of the shell 300. In one embodiment, the dimensions labeled in FIG. 4 and corresponding purely exemplary measurements are indicated in Table 2. In FIG. 4 and Table 2, measurements indicated by reference characters c, e, g, I, k and m represent perpendicular distances with respect to line x, up to the points indicated by the respective characters c, e, g, I, k and m. It should be noted that FIGS. 3 and 4 and others herein are not necessarily to scale, as they are provided for illustrative purposes only.

TABLE 2

| Reference Character | Length (in.) |
| --- | --- |
| a | 2 |
| b | 3.5 |
| c | 9.5 |
| d | 5.875 |
| e | 7.5 |
| f | 7 |
| g | 5.5 |
| h | 7.5 |
| i | 3.5 |
| j | 7.5 |
| k | 1.5 |
| l | 7.33 |
| m | .5 |
| n | 7 (radius) |
| x | 14 |

In accordance with an aspect of the invention, various manufacturing options are contemplated. As noted, materials may be assembled from component parts by sewing, as by hand, or such processes as materials cutting and assembly may be automated. Generation of materials to be assembled may range from by-hand preparation to precision cutting by CNC or countless other methods. In either case, component parts may generally resemble embodiments illustrated herein, or may vary widely, including having various cutouts, angles, etc., as to avoid overlap of excess material during manipulation of materials into 3D shapes. Alternatively, unitary materials that do not require assembly may be used. Potentially suitable materials as well vary widely. For example, composite materials are also available that are waterproof on one side and incorporate a softer surface on another, for example. Three-dimensional (3D) printing methods have also advanced dramatically and are available for use with a multitude of different materials, many of them flexible/pliable and waterproof. Soft, flexible materials may also be injection molded, among countless other potentially suitable manufacturing methods.

One skilled in the art will readily appreciate that the measurements herein provided are highly specific to a particular embodiment, are offered for illustrative purposes only and represent only a narrow slice of the full scope of the disclosed invention.

Example aspects of the present invention have now been described in accordance with the above advantages. It will be appreciated that these examples are merely illustrative thereof. Many variations and modifications will be apparent to those skilled in the art. For example, while certain embodiments are adapted for use in a moving vehicle, the same or other embodiments with variations might be suitable for use in different environments. While often appropriate for use with dogs, the invention is likewise applicable for carrying a wide variety of objects or substances for the benefit of humans as well as dogs and other animals. As another example, construction materials noted herein are purely exemplary, as are component/accessories such as an optionally-adjustable strap, hooks, loops, swivels, releasable/permanent connection means, etc. References herein to an object of the invention alternately as a container, bowl or other such device do not imply any structural or functional distinction. Nor do references to containing water exclude the possibility of transporting and/or providing access to other liquids or solids, food or otherwise. Exemplary measurements and capacities have also been provided by way of example and are not limiting. As such, countless variations on the embodiments disclosed herein remain within the intended scope of the invention.

The previous description is provided to enable any person skilled in the art to practice the various aspects described herein. Various modifications to these aspects will be readily apparent to those skilled in the art, and the generic principles defined herein may be applied to other aspects. Thus, the invention is not intended to be limited to the aspects shown herein, but rather is to be accorded the full scope consistent with the claim language, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A container, comprising:
   a body having an approximately cylindrical shape and at least one side;
   a base at a first end of the body;
   an opening at a second end of the body opposite the first end;
   a spill guard, adjacent the opening, formed as a continuously curved vertical in-line extension of a portion of the body such that a first length of the body that includes the spill guard is greater than a second length of the body that does not include the spill guard, wherein the vertical extension is configured to minimize spillage of a liquid maintained within the container, the spill guard being a unibody feature of the body; and
   a strap coupled to the body for supporting the container during use.

2. The container of claim 1, the body comprising:
   an inner lining; and
   an outer shell.

3. The container of claim 2, the inner lining comprising a food-safe, waterproof material.

4. The container of claim 1, further comprising:
   a first hook connected to a first end of the strap, the strap being detachable from the body and length-adjustable for use as a pet leash.

5. The container of claim 4, the strap comprising an overlapping material being adjustable in length and adjustable to form a hand-hold.

6. The container of claim 4, further comprising:
   a second hook connected to a second end of the strap.

7. The container of claim 1, the body comprising:
   an inner lining formed from a soft food-safe, waterproof material; and
   an outer lining adapted to maintain a shape of the container.

8. The container of claim 7, further comprising:
   a trim portion about the outer circumference of the approximately cylindrical shape of the body adjacent the opening and overlapping a junction formed between the inner lining and the outer shell.

9. The container of claim 7, the base having formed therein at least one weep hole to increase air flow between the inner lining and the outer shell.

10. The container of claim 1, the body comprising a flexible material.

11. The container of claim 1, further comprising:
    a support connected to the body of the container as a connection point for releasably coupling the strap to the body of the container, the support being configured such that upon supporting the body by the strap, the container is maintained in an upright position.

12. A container, comprising:
    a body having a side, a base and an opening, the body of the container being adapted to maintain a volume of liquid;
    a spill guard forming a continuously curved vertical linear extension of the body adjacent the opening such that a shortest distance from the base to the opening at a first portion of the body is greater than a shortest distance from the base to the opening at a second portion of the body, the spill guard being a unibody feature of the body; and
    a strap coupled to the body for supporting the container during use.

13. The container of claim 12, the body comprising:
    an inner lining; and
    an outer shell.

14. The container of claim 13, the inner lining comprising a food-safe, waterproof material.

15. The container of claim 12, further comprising:
    a support connected to the body of the container as a connection point for releasably coupling the strap to the body of the container, the support being configured such that upon supporting the body by the strap, the container is maintained in an upright position.

16. The container of claim 12, the strap releasably coupling the container to an object during use;
    the body being supported by the strap such that upon movement of the object, resulting pendular motion of the body acts to lessen movement of the body;
    a location of the support being configured such that upon being supported by the strap, the body is maintained in an upright position.

17. The container of claim 12, the strap being configured to be adjustably hung from a seat of a vehicle.

18. A container for supporting a quantity of a liquid, comprising:
    a body made primarily from a flexible, waterproof liner formed into a side, an open end, and a closed base opposite the open end;
    a spill guard comprising a continuously curved vertical linear extension of the liner such that a first length of the body that includes the spill guard is greater than a second length of the body that does not include the spill guard, wherein the vertical extension is configured to minimize spillage of a liquid maintained within the container, the spill guard being a unibody feature of the body; and a strap releasably connected to the body via rings for coupling the container to an object during use;

the body being constructed to at least temporarily maintain the liquid without leakage through the body; and the body being supported by the strap such that upon movement of the object, resulting pendular motion of the body acts to lessen movement of the body with respect to the object;

a location of the rings being configured such that upon being supported by the strap, the body is maintained in an upright position.

19. The container of claim 18, further comprising:

an outer shell disposed about the body and covering at least a portion of the liner.

\* \* \* \* \*